(12) United States Patent
Maeda et al.

(10) Patent No.: US 6,938,390 B2
(45) Date of Patent: Sep. 6, 2005

(54) STRUCTURE REINFORCING METHOD, STRUCTURE-REINFORCING REINFORCING FIBER YARN-CONTAINING MATERIAL, REINFORCING STRUCTURE MATERIAL AND REINFORCED STRUCTURE

(75) Inventors: Toshiya Maeda, Kawasaki (JP); Yoshihide Mori, Kuga-gun (JP); Kentarou Tsubouchi, Kawasaki (JP); Hideyuki Komaki, Tokyo (JP)

(73) Assignee: Nippon Oil Corporation, Tokyo (JP)

( * ) Notice: Subject to any disclaimer, the term of this patent is extended or adjusted under 35 U.S.C. 154(b) by 155 days.

(21) Appl. No.: 10/312,458

(22) PCT Filed: Jun. 29, 2001

(86) PCT No.: PCT/JP01/05621

§ 371 (c)(1),
(2), (4) Date: Dec. 23, 2002

(87) PCT Pub. No.: WO02/01020

PCT Pub. Date: Jan. 3, 2002

(65) Prior Publication Data

US 2003/0101676 A1 Jun. 5, 2003

(30) Foreign Application Priority Data

| | | | |
|---|---|---|---|
| Jun. 29, 2000 | (JP) | ...................................... | 2000-196225 |
| Aug. 31, 2000 | (JP) | ...................................... | 2000-264335 |
| Aug. 31, 2000 | (JP) | ...................................... | 2000-264342 |
| Aug. 31, 2000 | (JP) | ...................................... | 2000-264388 |

(51) Int. Cl.⁷ .............................................. E04C 3/36
(52) U.S. Cl. ...................... 52/721.4; 52/514; 52/741.4; 156/71
(58) Field of Search ...................... 52/309, 514, 741.4, 52/721.4; 156/71, 166, 184; 428/325, 41.7, 41.9, 473.5

(56) References Cited

U.S. PATENT DOCUMENTS

| | | | | |
|---|---|---|---|---|
| 3,340,115 A | * | 9/1967 | Rubenstein | 52/DIG. 7 |
| 5,043,033 A | * | 8/1991 | Fyfe | 52/514 |
| 5,218,810 A | * | 6/1993 | Isley, Jr. | 52/723.1 |
| 5,326,630 A | * | 7/1994 | Saito et al. | 156/178 |
| 5,447,593 A | * | 9/1995 | Tanaka et al. | 52/723.1 |
| 5,542,229 A | * | 8/1996 | Saito et al. | 52/721.5 |
| 5,645,664 A | * | 7/1997 | Clyne | 52/741.41 |
| 5,711,834 A | * | 1/1998 | Saito | 52/746.1 |
| 5,924,262 A | * | 7/1999 | Fawley | 52/721.4 |
| 6,177,185 B1 | * | 1/2001 | Face, Jr. | 52/742.1 |
| 6,457,289 B1 | * | 10/2002 | Scherer | 52/514 |

FOREIGN PATENT DOCUMENTS

| | | | | |
|---|---|---|---|---|
| JP | 9-078848 | 3/1997 | ........... | E04G/23/02 |
| JP | 09-268776 | 10/1997 | ........... | E04G/23/02 |
| JP | 10-102792 | 4/1998 | ........... | E04G/23/02 |

* cited by examiner

Primary Examiner—Peter R. Brown
(74) Attorney, Agent, or Firm—Darby & Darby (57) ABSTRACT

A method for reinforcing a structure with a sheet containing reinforcing fiber yarns is disclosed, by which method separation of the sheet is sufficiently prevented, maximum use of the sheet strength is achieved, and existing structures are effectively reinforced. The method includes the step of providing a sheet containing reinforcing fiber yarns over the surface of a structure selected from the group consisting of concrete and steel structures, with a flexible material interposed therebetween, the flexible material having a tensile elongation of 10 to 200% at maximum load at 23° C., and a tensile strength of 0.1 to 50 N/mm² at 23° C.

19 Claims, 7 Drawing Sheets

Distance from Center of Beam

STRUCTURE REINFORCING METHOD, STRUCTURE-REINFORCING REINFORCING FIBER YARN-CONTAINING MATERIAL, REINFORCING STRUCTURE MATERIAL AND REINFORCED STRUCTURE

FIELD OF INVENTION

The present invention relates to a method for reinforcing concrete or steel structures, such as beams, columns, slabs, walls, stacks, RC beams, slabs, railway tunnels, road tunnels, mountain tunnels, aqueduct tunnels for hydroelectric power stations, headrace tunnels, pressure headrace tunnels, various other tunnels, underground structures such as Hume pipes which are subjected to stress such as internal and/or external pressure, bridges having a curved surface, and U-shaped gutters, by means of a sheet containing reinforcing fiber yarns. The present invention also relates to sheets containing reinforcing fiber yarns for use in the above reinforcing method, structure reinforcements, and reinforced structures reinforced therewith.

BACKGROUND OF THE INVENTION

There have recently been seen some concrete or steel structures of which properties at the time of designing are no longer maintained due to deterioration of structural members over time. Reinforcement or repair of such structures has been effected, such as reinforcement for improving their earthquake-proof properties, repair for suppressing deterioration of structural members, or reinforcement for improving their functionality.

Conventional reinforcing methods include, for example, affixing sheets containing reinforcing fibers, such as reinforcing fiber sheets and/or fiber-reinforced plastic plates, over the surface of a structure to be reinforced to integrate the sheet with the structure. This reinforcing method has been generally adopted with many successful results. On the other hand, methods for reinforcing a concrete surface of tunnel inner walls are also known, which include lining the outer concrete surface with shotcrete or PC plates, and optionally arch-setting with liner plates and H-steels, and splicing steel plates. Also known are methods for repairing or reinforcing headrace tunnels and the like for resolving problems such as water leakage, decline in strength due to internal and external pressures, or decrease in actual water delivery. These methods include, for example, a spraying method wherein steel fiber-containing mortar or steel fiber-containing concrete is sprayed over the surface of the existing concrete lining, a painting method wherein resin mortar or steel fiber-containing mortar is painted over the surface, a casting method, and an affixing method.

Among the various methods mentioned above, for example, when the method of affixing sheets containing reinforcing fibers over a structure surface is performed using sheets that are hard to break and high in tensile strength, the sheets provide excellent reinforcing effect, as long as the sheets are fixed to the structure. In the final stage of the structure life, however, the sheets containing reinforcing fibers tend to separate from the structure before they are broken, loosing the reinforcing effect, which ultimately leads to breakdown of the structure.

For the purpose of overcoming such drawbacks, there have been proposed methods for preventing separation of the sheets containing reinforcing fibers from the structure. Such methods include, for example, providing an additional material containing reinforcing fibers for fixing the sheets for reinforcement to the structure, or fixing the sheets to the structure by means of anchors or metal plates. With these methods, however, maximum use of the sheet strength is hard to be enjoyed, or the working process maybe complicated. Further, in the case of tunnel structures having a curved surface, even a small displacement will tend to cause separation of the sheets from the inner wall of the tunnel structure, and thus the reinforcing effect is hard to obtain.

There is also known a method wherein the sheets containing reinforcing fibers are stuck to the inner wall surface of a structure with an adhesive. However, conventional adhesives are only for sticking the sheets, and little cushioning effect is provided between the sheets and the structure. Thus sufficient and long-lasting prevention of separation is not achieved. Incidentally, conventional adhesives can only form a layer having a tensile elongation of less than 5% at maximum load at 23° C.

SUMMARY OF THE INVENTION

It is therefore an object of the present invention to provide a method for reinforcing a structure with a sheet containing reinforcing fiber yarns, by which method separation of the sheet is sufficiently prevented even when the sheet is provided on the surface of structures such as beams, columns, or RC beams, or on curved surfaces, maximum use of the sheet strength is enjoyed, and existing concrete or steel structures are effectively reinforced.

It is another object of the present invention to provide, for reinforcing a structure with a sheet containing reinforcing fiber yarns, a structure-reinforcing sheet containing reinforcing fiber yarns and a structure reinforcement utilizing the same, which are effectively prevented from being separated, exhibit the maximum strength, and are suitable for easy and sufficient reinforcement.

It is still another object of the present invention to provide a reinforced structure of concrete or steel of which strength and durability are reinforced.

According to the present invention, there is provided a method for reinforcing a structure comprising the step (A) of providing a sheet containing reinforcing fiber yarns (sometimes referred to as sheet (a) hereinbelow) over a surface of a structure selected from the group consisting of concrete and steel structures, with a flexible material interposed therebetween, said flexible material having a tensile elongation of 10 to 200% at maximum load at 23° C., and a tensile strength of 0.1 to 50 N/mm² at 23° C.

According to the present invention, there is also provided a structure-reinforcing sheet containing reinforcing fiber yarns, wherein said structure-reinforcing sheet is sheet (a) for use in the reinforcing method mentioned above, and comprises a reinforcing material having a plurality of longitudinal reinforcing fiber yarns arranged parallel to each other in a longitudinal direction of said sheet.

According to the present invention, there is also provided a structure reinforcement for reinforcing a structure selected from the group consisting of concrete and steel structures, said reinforcement comprising a flexible material layer and sheet (a), said flexible material layer having a tensile elongation of 10 to 200% at maximum load at 23° C., and a tensile strength of 0.1 to 50 N/mm² at 23° C.

According to the present invention, there is further provided a reinforced structure wherein the structure reinforcement mentioned above is provided over a surface of a structure selected from the group consisting of concrete and steel structures, with a flexible material layer of said structure reinforcement interposed between the surface of the structure and a sheet containing reinforcing fiber yarns of the structure reinforcement.

PREFERRED EMBODIMENTS OF THE INVENTION

The reinforcing method according to the present invention includes the step (A) of providing sheet (a) over a surface of a concrete or steel structure, with the particular flexible material interposed between the surface and the sheet.

When the structure to be reinforced is, for example, a column or stack, step (A) is preferably providing sheet (a) over the outer surface of the structure, with the particular flexible material interposed therebetween, so that, when reinforcement against bending is principally intended, the reinforcing fiber yarns of sheet (a) are arranged in the longitudinal or axial direction of the structure or in the direction of the tensile stress to be generated, whereas when reinforcement against shearing is principally intended, the reinforcing fiber yarns are arranged in the circumferential direction or at right angles to the axial direction of the structure or in the direction of the shearing stress to be generated.

When the structure to be reinforced is a beam or RC beamstep (A) is preferably providing sheet (a) over the surface of the structure, with the particular flexible material interposed therebetween, so that, when the reinforcement against bending is principally intended, the reinforcing fiber yarns of sheet (a) are arranged in the longitudinal or axial direction of the structure or in the direction of the tensile stress to be generated, whereas when the reinforcement against shearing is principally intended, the reinforcing fiber yarns are arranged in the circumferential direction or at right angles to the axial direction of the structure or in the direction of the shearing stress to be generated.

When the structure to be reinforced is a deck or a slab, step (A) is preferably providing sheet (a) over the upper and/or lower surface of the structure, with the particular flexible material interposed therebetween, so that, when the reinforcement against bending is principally intended, the reinforcing fiber yarns of sheet (a) are arranged in the longitudinal or axial direction of the structure or in the direction of the tensile stress to be generated, whereas when the reinforcement against shearing is principally intended, the reinforcing fiber yarns are arranged in the transverse direction or at right angles to the axial direction of the structure or in the direction of the shearing stress to be generated.

When the structure to be reinforced has no reinforcing steel therein, sheet (a) may be arranged in any suitably selected direction.

When the structure to be reinforced has a curved surface on its inner wall, step (A) is preferably providing sheet (a) at least over the curved surface on the inner wall of the structure, with the particular flexible material interposed therebetween, so that the reinforcing fiber yarns of sheet (a) are arranged along the curvature of the curved surface.

When the structure to be reinforced has an annular inner wall surface, step (A) is preferably providing sheet (a) continuously in the circumferential direction of the inner wall surface over at least a portion of the length of the structure, with the particular flexible material interposed therebetween, so that the reinforcing fiber yarns of sheet (a) are arranged in the circumferential direction of the annular inner wall.

Sheet (a) used in step (A) for reinforcing a particular structure such as those mentioned above, may preferably be a sheet containing a reinforcing material shown in FIG. 1, 2, or 4 to be discussed later.

The flexible material may be a material containing a thermosetting or thermoplastic resin, or mixed resins thereof. The thermosetting rein may be, for example, an epoxy, methylmethacrylate, or methacrylate resin, or mixtures thereof. The thermoplastic resin may be, for example, a nylon, polycarbonate, polyurethane, polyethylene, or polypropylene resin, or mixtures thereof.

The resin contained in the flexible material preferably has, when cured alone, a tensile modulus of elasticity of 0.1 to 50 $N/mm^2$, more preferably 0.5 to 10 $N/mm^2$ at 23° C. The tensile modulus of elasticity may be measured in accordance with JIS K7113. The content of the resin in the flexible material is usually 50 to 100 wt %, preferably 59 to 98 wt %, more preferably 70 to 80 wt %.

In order to maintain the flexible material within a suitable range of viscosity for forming a flexible material layer, or to prevent sagging of the material for facilitating application to the structure, the flexible material may optionally contain a filler or a thixotropic agent as desired in addition to the resin, as long as the objects of the present invention are achieved. Addition of a filler will slightly decrease the tensile elongation at maximum load of the flexible material, but the tensile strength and the tensile modulus of elasticity will be improved.

The filler may be, for example, carbon black, calcium carbonate, talc, silic acid, silicate, or an inorganic pigment such as white lead, red lead, chrome yellow, titanium dioxide, strontium chromate, titanium yellow, or other pigment. The content of the filler in the flexible material is usually 0 to 50 wt %, preferably 1 to 40 wt %, more preferably 10 to 20 wt %.

Thixotropic agents have organic and inorganic types. Among the inorganic thixotropic agents, for example, fumed silica, smectite clay minerals, swelling mica, synthetic smectite, bentonite, carbon black, and hectorite may preferably be used. The content of the thixotropic agent in the flexible material is usually 0 to 50 wt %, preferably 1 to 40 wt %, more preferably 10 to 20 wt %.

The flexible material has a tensile elongation of 10 to 200%, preferably 10 to 100%, at maximum load at 23° C. In applying a starting material for the flexible material to the surface of a structure, undesirable sagging of the material may occur, which may sometimes be prevented by setting the tensile elongation at maximum load at a lower value. On the other hand, it is particularly preferred that the flexible material has a larger tensile elongation at maximum load than that of a resin in sheet (a) or a matrix resin for sticking sheet (a), which resins will be discussed later. The tensile strength of the flexible material is 0.1 to 50 N/mm$^2$ at 23° C. The tensile elongation at maximum load and the tensile strength of the flexible material may be measured in accordance with JIS K7113.

By setting the tensile elongation at maximum load and the tensile strength of the flexible material at 23° C., as well as the tensile modulus of elasticity at 23° C. of the resin in the flexible material, if contained, to be within the above ranges, separation of sheet (a) is prevented, and maximum use of the strength of sheet (a) may be enjoyed.

It is particularly preferred that the flexible material has a tensile elongation of 10 to 200%, more preferably 10to 100%, at maximum load at 5° C., and a tensile strength of 0.1 to 50 N/mm$^2$ at 5° C. It is also particularly preferred that the resin contained in the flexible material, if any, has a tensile modulus of elasticity of 0.1 to 50 N/mm$^2$, more preferably 0.5 to 10 N/mm$^2$ at 5° C., when cured alone. With such a flexible material that is capable of maintaining the above material properties even at lower temperatures, excellent reinforcing effect may be provided even under the cold conditions.

The flexible material may be selected from commercially available products, such as EE50, EE50W, or EE60, all manufactured by TOHO EARTHTECH, INC.

The flexible material is provided in the form of a layer over the surface of a structure to be reinforced either directly or via other layers optionally provided as desired, such as a primer layer. The thickness of the flexible material layer is not particularly limited, and is usually 100 to 2000 μm, preferably 200 to 1000 μm.

The flexible material layer functions to disperse and transmit the stress generated in the structure to sheet (a). The flexible material layer may also be given improved adhesion to sheet (a) by modifying its surface, i.e. the surface facing to sheet (a), through a physical or chemical treatment, if desired. The physical treatment may be surface roughening by grinding or with a sand paper, or ultrasonic treatment. The chemical treatment may be partial oxidation of the surface or addition of functional groups to the surface, such as a treatment with corona, plasma, or an oxidizing agent. These treatments may preferably be effected when, in particular, the flexible material contains a polyethylene or polypropylene resin, or the like resin.

The flexible material layer may be formed by (i) applying a liquid starting material for the flexible material over the surface of a structure to be reinforced and then curing the material, or (ii) affixing a material which has the flexible material and is formed into a film, sheet, or the like shape, over the surface of a structure to be reinforced.

When the flexible material layer is to be formed by the above method (i), a starting material for the flexible material is used which exhibits, when cured, the particular tensile elongation at maximum load and the particular tensile strength mentioned above. For example, a starting material composed of the various thermosetting and/or thermoplastic resins mentioned above, or the starting material further mixed with the filler and/or the thixotropic agent, may be used. Here, as a thermosetting resin, a room temperature-setting type is preferred for its good handleability. Two component resins are also preferred.

The thermosetting resin of a room temperature-setting type preferably has, as a staring material for the flexible material, a pot life of 30 minutes to 5 hours, more preferably 30 minutes to 2 hours, at 20° C. in view of handleability. The time required for curing a painted layer of the thermosetting resin at 20° C. is preferably 1 to 24 hours, more preferably 1 to 12 hours, in view of work schedule. The time required for the starting material for the flexible material to express design strength is usually 1 to 20 days, preferably 1 to 7 days, at 20° C. The viscosity of the starting material for the flexible material measured in accordance with JIS K6833 is usually 50 to 1000000 mPa·s, preferably 5000 to 300000 mPa·s, at 20° C. for facilitating application.

The starting material for the flexible material may be applied uniformly by means of roller brushes, rubber spatulas, trowels, or the like tools, to have a desired thickness as mentioned above.

The starting material for the flexible material, when it contains a thermosetting resin, may be cured by heating to its curing temperature with a hot roller or a dryer, after application to the surface of a structure to be reinforced. When the starting material contains a thermosetting resin of a room temperature-setting type, the starting material may be cured simply by leaving the material to stand at a room temperature for a time period required for expression of its design strength.

When the flexible material layer is to be formed by the above method (ii), the starting material for the flexible material may preferably contain a thermoplastic rein or a flexible thermosetting resin.

The material having the flexible material and formed into a particular shape may usually be affixed by a suitably selected conventional method, such as fusing with heat or sticking with an adhesive. The adhesive is preferably selected from those which are capable of sticking the flexible material layer to a structure to be reinforced at a bonding strength higher than the strength of the structure, and is preferably of the same kind of material as the starting material for the flexible material.

Sheet (a) used in the reinforcing method of the present invention contains reinforcing fiber yarns. The reinforcing fibers in the reinforcing fiber yarns may be carbon fibers, glass fibers, ceramic fibers, aramid fibers, silicon carbide fibers, or combinations thereof, with carbon fibers being particularly preferred for their light weight and corrosion resistance. The carbon fibers may be pitch-based carbon fibers, polyacrylonitrile (PAN)-based carbon fibers, or combinations thereof.

When the carbon fibers are required to have a high elasticity, pich-based carbon fibers may usually be used, such as XN60 manufactured by NIPPON GRAPHITE FIBER CORPORATION. When the carbon fibers are required to have a high strength, polyacrylonitrile-based carbon fibers may usually be used, such as T700SC or T300 both manufactured by TORAY INDUSTRIES, INC., UT500 manufactured by TOHO RAYON KABUSHIKI KAISHA, or TR30 manufactured by MITSUBISHI RAYON CO., LTD.

The reinforcing fibers are made into two-dimensional fabrics, unidirectional fabrics, or unidirectional material, which are used as the reinforcing fiber yarns composing sheet (a).

Sheet (a) may be any material in the form of a sheet that contains reinforcing fiber yarns. This term is interpreted to include plastic plates that contain reinforcing fiber yarns.

It is usually preferred that sheet (a) has a fiber area weight of 100 to 800 g/m$^2$, 1000 to 10000 filaments per one reinforcing fiber yarn, a tensile strength of 2000 to 5000 N/mm$^2$, and a tensile modulus of elasticity of $2 \times 10^5$ to $1 \times 10^6$ N/mm$^2$.

The sheet containing reinforcing fiber yarns according to the present invention is a sheet (a) which contains a reinforcing material having a plurality of longitudinal reinforcing fiber yarns arranged parallel to each other in a longitudinal direction of the sheet, which sheet is referred to as sheet (1). Preferred examples of sheet (1) of the present invention may include the following sheets:

Sheet (2) wherein the reinforcing material of sheet (1) further has a plurality of transverse threads arranged parallel to each other in a transverse direction of the sheet. The transverse threads are transverse reinforcing fiber yarns and/or transverse supplementary threads, and the longitudinal reinforcing fiber yarns and the transverse threads form a woven structure.

Sheet (3) wherein the longitudinal reinforcing fiber yarns and the transverse threads in sheet (2) are stuck and fixed to each other with fixing members.

Sheet (4) wherein the reinforcing material of sheet (1) further has a plurality of longitudinal supplementary threads arranged parallel to each other in the longitudinal direction of the sheet, and a plurality of transverse supplementary threads arranged parallel to each other in the transverse direction of the sheet. The reinforcing material has a woven structure wherein the longitudinal reinforcing fiber yarns are substantially not bent with the longitudinal and transverse supplementary threads.

Sheet (5) containing the reinforcing material of any one of sheets (1) to (4) and a support for supporting the reinforcing material. The reinforcing material is affixed to the support by means of a binder.

Sheet (3) falling within the concept of sheet (2) may be, for example, a cloth-like sheet wherein one of its warps and wefts are the reinforcing fiber yarns, and the other are supplementary threads made of fibers containing a thermoplastic resin. The fibers containing a thermoplastic resin may be fibers of a thermoplastic resin, or any fibers having a thermoplastic resin or thermoplastic fibers stuck thereto. The warps and wefts are stuck and fixed to each other with the thermoplastic resin in the fibers containing a thermoplastic resin.

Sheet (5) may be, for example, a sheet which has the reinforcing fiber yarns arranged unidirectionally and a net-like lattice containing a thermoplastic resin. The lattice is mounted on and affixed to the sheet by means of the thermoplastic resin in the fibers containing a thermoplastic resin.

Figure 1:
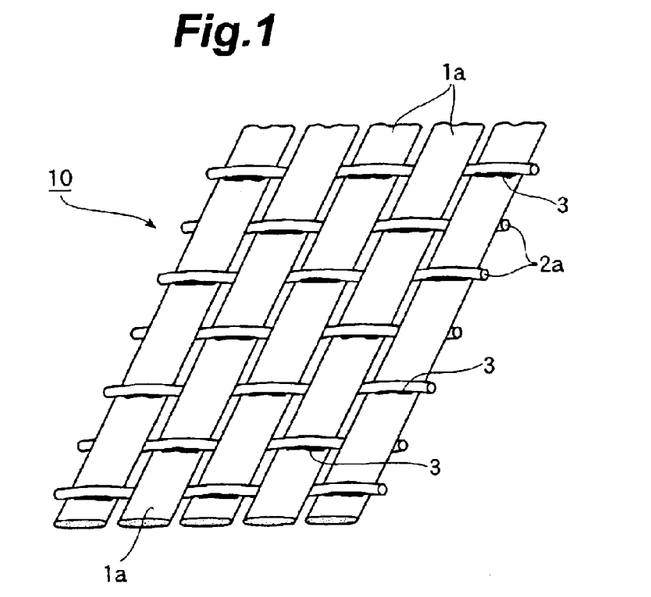
FIG. 1 is a schematic perspective view showing an embodiment of a reinforcing material for a sheet containing reinforcing fiber yarns according to the present invention.

Sheet (3) falling within the concept of sheet (1) or (2) may be, for example, a sheet containing reinforcing material 10 shown in FIG. 1. The reinforcing material 10 is a material which has a plurality of reinforcing fiber yarns 1a arranged parallel to each other in the longitudinal direction of the sheet, and a plurality of transverse supplementary threads 2a. The yarns 1a and the threads 2a cross over each other to form a unidirectional reinforcing fiber fabric. The reinforcing fiber yarns 1a and the transverse supplementary threads 2a are stuck and fixed to each other with fixing members 3.

Figure 2:
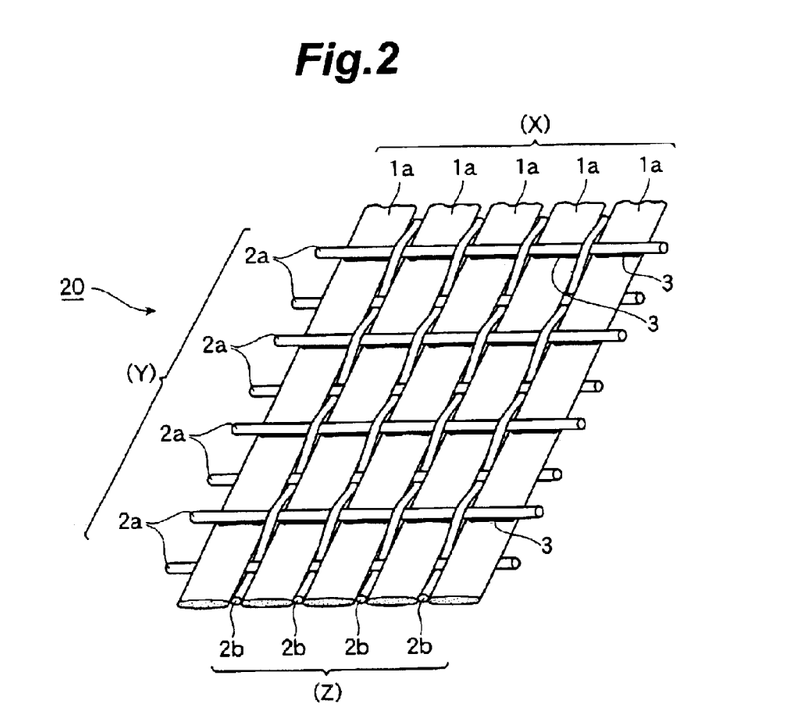
FIG. 2 is a schematic perspective view showing another embodiment of a reinforcing material for a sheet containing reinforcing fiber yarns according to the present invention.

Sheet (3) falling within the concept of sheet (1), (2), or (4) may be, for example, a sheet containing reinforcing material 20 shown in FIG. 2. The reinforcing material 20 is a material wherein set (X) of plurality of reinforcing fiber yarns 1a arranged parallel to each other in the longitudinal direction of the sheet and oriented unidirectionally in the form of a sheet, set (Y) of a plurality of transverse supplementary threads 2a arranged on front and back sides of set (X), and set (Z) of longitudinal supplementary threads 2b arranged at right angles to set (Y) and parallel to set (X), form a woven fabric without substantially bending the reinforcing fiber yarns 1a. The reinforcing fiber yarns 1a, the transverse supplementary threads 2a, and the longitudinal supplementary threads 2b are stuck and fixed to each other with the fixing members 3 at appropriate locations.

Figure 3:
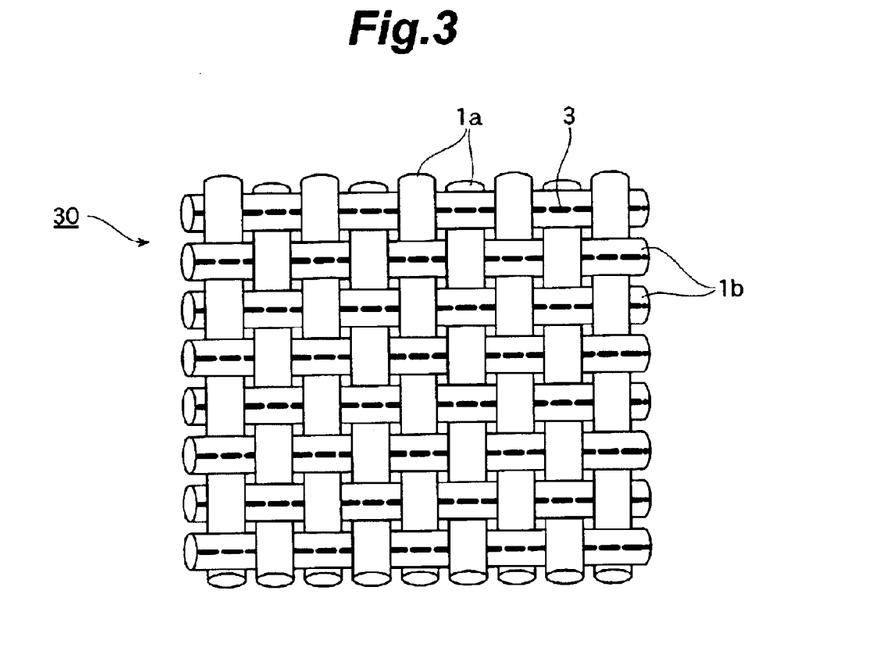
FIG. 3 is a schematic perspective view showing yet another embodiment of a reinforcing material for a sheet containing reinforcing fiber yarns according to the present invention.

Sheet (3) falling within the concept of sheet (1) or (2) may be, for example, a sheet containing reinforcing material 30 show in FIG. 3. The reinforcing material 30 is a bidirectional plain weave fabric of reinforcing fiber yarns, wherein a plurality of reinforcing fiber yarns 1a arranged parallel to each other in the longitudinal direction of the sheet are arranged at right angles to a plurality of transverse reinforcing fiber yarns 1b. The longitudinal reinforcing fiber yarns 1a and the transverse reinforcing fiber yarns 1b are stuck and fixed to each other with the fixing members 3.

Figure 4:
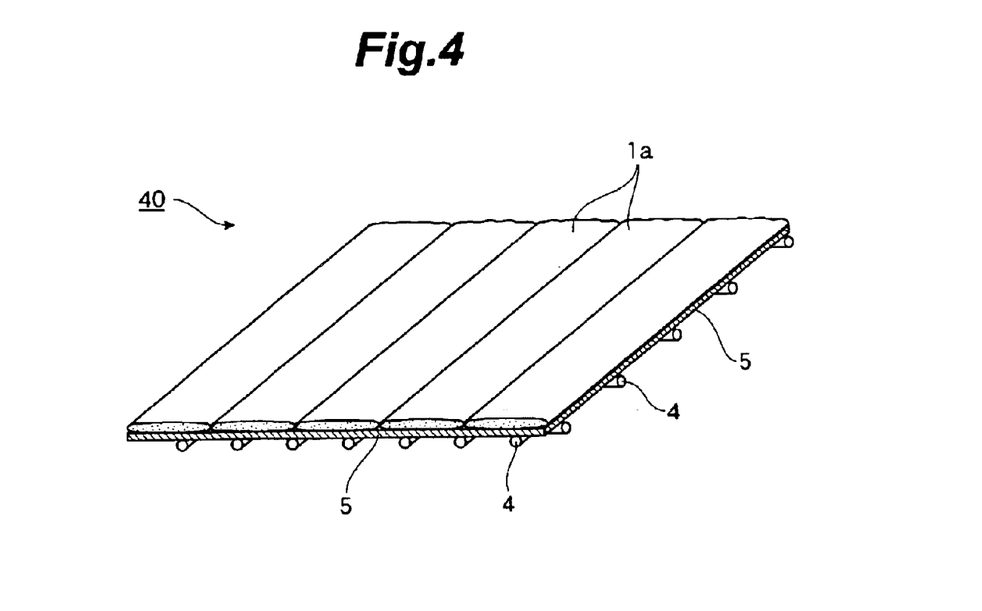
FIG. 4 is a schematic perspective view showing still another embodiment of a reinforcing material for a sheet containing reinforcing fiber yarns according to the present invention.

Sheet (5) falling within the concept of sheet (1) may be, for example, a sheet containing reinforcing material 40 shown in FIG. 4. The reinforcing material 40 is a material wherein mesh-like support 4 is affixed by means of a binder 5 to one side of a sheet made of a plurality of reinforcing fiber yarns 1a arranged parallel to each other in the longitudinal direction of the sheet.

The material of the binder 5 is not particularly limited, and may be selected from those similar to the materials for the matrix resin to be discussed later. The amount of the binder 5 to be applied is preferably 3 to 7 parts by weight based on 100 parts by weight of the reinforcing fiber yarns 1a.

In the various reinforcing materials mentioned above, the longitudinal reinforcing fiber yarns 1a may be, or may not be, stuck and fixed to the transverse supplementary threads 2a or transverse reinforcing fiber yarns 1b by means of the fixing members 3 made of, for example, a low-melting polymer. The fixing members 3 may be contained in advance in the longitudinal reinforcing fiber yarns 1a, transverse supplementary threads 2a, or transverse reinforcing fiber yarns 1b.

The material of the fixing members 3 is not particularly limited, and may be, for example, nylon, nylon copolymers, polyester, vinylidene chloride, vinyl chloride, polyurethane, or mixtures thereof, with nylon copolymers being particularly preferred. The transverse supplementary threads 2a and the longitudinal supplementary threads 2b are preferably made of glass fibers.

When a plastic plate is to be used as sheet (a), such a plastic plate may be prepared by impregnating the reinforcing material in the form of a two-dimensional fabric, unidirectional fabric, or unidirectional material, with a material containing a matrix resin, and curing by heating into a plate shape.

The matrix resin may be a thermosetting or thermoplastic resin, or mixtures thereof. The thermosetting resin may be, for example, an epoxy, methylmethacrylate, or methacrylate resin, or mixtures thereof. The thermoplastic resin may be a nylon, polycarbonate, polyurethane, polyethylene, or polypropylene resin, or mixtures thereof, and preferably has good adhesion.

According to the reinforcing method of the present invention, sheet (a) is provided over the surface of a structure to be reinforced, with the flexible material interposed therebetween. Here, sheet (a) may be provided over the surface of the flexible material either directly or via other layers optionally provided, such as an undercoating layer.

According to the reinforcing method of the present invention, other layers such as an overcoating layer and a finishing layer, may optionally be provided on sheet (a) For example, by applying a matrix resin material as an undercoating layer prior to the affixing of sheet (a), and applying the matrix resin material again as an overcoating layer after the affixing of sheet (a), a composite layer of sheet (a) and the matrix resin may be obtained, which has a high strength. When the plastic plate mentioned above is used as sheet (a), the plastic plate maybe affixed to the surface of the flexible material with an adhesive.

The thickness of sheet (a) is not particularly limited. The elongation at break of sheet (a) may preferably be 0.5 to 3.0%, more preferably 0.6 to 2.0%.

The concrete or steel structures to which the reinforcing method of the present invention is to be applied, are not particularly limited, and may include various structures such as columns, beams, slabs, walls, RC beams, slabs, stacks, tunnels, pipes, tubes, ducts, conduits, bridges having a curved surface, and U-shaped gutters. The structures to be reinforced include not only existing buildings, but also structures to be made into buildings, such as concrete or steel parts as manufactured at factories.

In the present invention, "reinforcing" means not only reinforcing of undeteriorated structures, but also repairing of deteriorated structures. The structures having a curved surface includes, for example, structures having a longitudinally-extending curved surface with the radius of not smaller than 300 mm, whereas the structures having an annular inner wall surface includes, for example, structures having an annular inner wall surface with the radius of not smaller than 300 mm. Specifically, the structures having a longitudinally-extending curved surface on its inner wall or an annular inner wall surface which are constructed in the ground and placed under stress such as internal and/or external pressure, may be included, such as railway tunnels, road tunnels, mountain tunnels, aqueduct tunnels for hydroelectric power stations, agricultural aqueduct tunnels, headrace tunnels for water supply and sewage works, headrace tunnels for industrial water, headrace tunnels for tailraces for rivers, pressure headrace tunnels, and Hume pipes.

A specific example of the working process of the present reinforcing method includes, for example, sequentially forming each layer as desired on the surface of a structure to be reinforced, such as a primer layer, a flexible material layer, an undercoating layer, sheet (a), an overcoating layer, and a finishing layer. Of these layers, the flexible material layer and sheet (a) are essential, and the other layers may be formed optionally. These layers may usually be formed sequentially from the layer closest to the structure surface. In some cases, however, a structure reinforcement containing a composite of the flexible material layer and sheet (a) may be formed in advance, and then affixed to the surface of the structure.

An example of the reinforcing method of the present invention is explained below with reference to FIG. 5.

Figure 5:
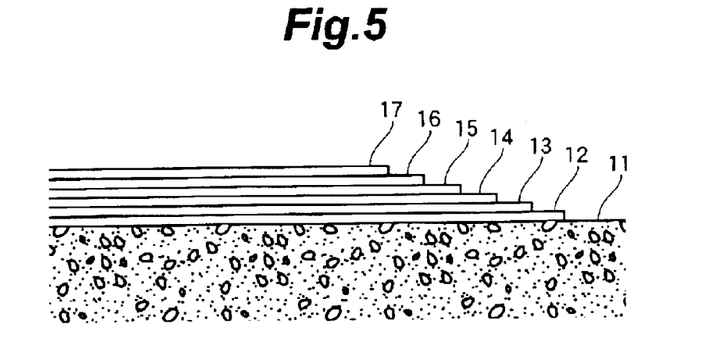
FIG. 5 is an illustration for explaining an embodiment of a reinforcing method according to the present invention.

Referring to FIG. 5, the numeral 11 refers to a structure to be reinforced. First, the surface of the structure 11 is pretreated as desired, such as by cleaning. When the structure is made of concrete, steps or fractures on the surface may also be pretreated by grinding or with a surface preparation material. The cleaning may be effected with a disc sander, waste cloth, or an organic solvent, or by sand blasting or high pressure washing.

The surface preparation material may be a resin having a compressive strength that is the same as or higher than the concrete strength, such as epoxy resin putty or epoxy resin mortar. The steps and fractures may be filled with such a resin in the pretreatment. It is also preferred to round projected and recessed corners in the pretreatment step. When desired pretreatments are completed, the positions of sheets (a) to be affixed may be marked as desired.

Next, primer is applied over the surface of the structure 11 with a roller brush or the like tool and dried to form primer layer 12. The primer may be a material having good adhesion to the structure 11 and flexible material layer 13, such as a solvent or non-solvent epoxy resin.

The mixing viscosity of the primer is usually 1 to 10000 mPa·s, preferably 10 to 5000 mPa·s at 20° C. in view of handleability.

The preferred temperature at which the primer is applied, is usually −10° C. to 50° C. The amount of the primer to be applied is usually 0.01 to 1 kg/m², preferably 0.1 to 0.5 kg/m². The time required for drying the primer at 20° C. is usually 1 to 24 hours, preferably 1 to 12 hours.

After the primer layer 12 is formed, a levelling material such as putty is optionally applied to smooth the unevenness of the primer layer surface, and then the flexible material layer 13 is formed thereon by a method such as those mentioned above. Instead of applying the levelling material such as putty, the flexible material layer 13 may be formed so as to smooth the unevenness of the primer layer surface. In this case, components of the levelling material may be added to the flexible material as desired. After the flexible material layer 13 is formed, the surface of the layer 13 may be modified as desired by a physical or chemical treatment. Then a matrix resin material or the like material for undercoating layer 14 may optionally be applied. The matrix resin material may suitably be selected from the examples of the matrix resin mentioned above which has good adhesion to the flexible material.

The matrix resin material may contain, in addition to the resin, a suitable filler or thixotropic agent in order to maintain the material within a suitable viscosity range or to prevent sagging upon application, as long as the objects of the present invention are achieved. Such filler and thixotropic agent may suitably be selected from the examples listed above in the discussion of the flexible material. The content of the filler and/or thixotropic agent in the matrix resin material is preferably 1 to 20 wt %.

When the matrix resin material contains a room temperature-setting resin, the pot life of the resin is preferably 30 minutes to 5 hours, more preferably 30 minutes to 2 hours at 20° C. in view of the handleability of the matrix resin material. The time required for curing a painted layer of the matrix resin material at 20° C. is preferably 1 to 24 hours, more preferably 1 to 12 hours in view of work schedule.

The time required for the matrix resin material to express its design strength is usually 1 to 20 days, preferably 1 to 7 days at 20° C. The viscosity of the matrix resin material is usually 10 to 100000 mPa·s, preferably 100 to 50000 mPa·s at 20° C. in view of readiness to permeate and defoam.

The matrix resin material for the undercoating layer may be applied by means of a roller brush, rubber spatula, or the like tool, so that usually 0.1 to 2 kg/m², preferably 0.2 to 1 kg/m² of the material is applied uniformly.

Next, sheet 15 as sheet (a) is affixed to the undercoating layer 14. This step may include sticking the sheet 15 at the marked position mentioned above immediately after the application of the material of the undercoating layer 14, and squeezing the surface of the sheet 15 with a rubber spatula, hot roller, defoaming roller, or the like tool, preferably in the direction of the reinforcing fiber yarns, more preferably from the center toward the edges of the sheet 15 along the reinforcing fiber yarns. By these steps, the sheet 15 is impregnated with the matrix resin material and the air bubbles in the sheet 15 are removed, leaving a smooth surface.

In the step of affixing the sheet 15, too much length of the sheet 15 will disturb the operation. Thus the sheet 15 may be cut into an appropriate length, and a plurality of the cut sheets may be spliced together. In this case, in order to provide a sufficient strength, it is preferred to splice the sheets together with the overlap width of not less than 100 mm in the direction for ensuring the strength.

Next, a matrix resin material for overcoating layer 16 is applied over the sheet 15. This step may include applying the same matrix resin material as used in the undercoating step, by means of a roller brush, rubber spatula, or the like tool, so that usually 0.05 to 2 kg/m², preferably 0.1 to 1 kg/m² of the material is applied uniformly.

In each of the above mentioned steps, it is preferred to immediately remove blisters, wrinkles, and kinks of the fibers, if any. It is also preferred to provide sufficient protection against fouling and rain.

Finally, a finishing step is carried out. This step may include applying a weather-proof coating such as of a urethane resin or fluororesin, or a polymer cement material, over the overcoating layer 16 to form a protective layer 17.

In the examples of the working process discussed so far, only one layer of the sheet containing reinforcing fiber yarns is provided. However, in the present reinforcing method, two or more layers of the sheets containing reinforcing fiber yarns may also be provided. Two or more layers of the sheets may be provided by repeating the steps of undercoating, affixing the sheet, and overcoating a desired number of times.

Figure 6:
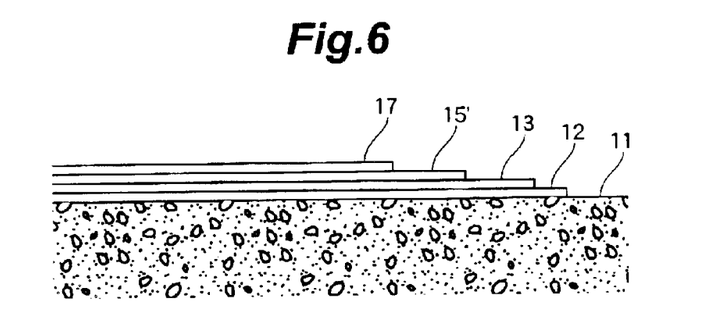
FIG. 6 is an illustration for explaining another embodiment of a reinforcing method according to the present invention.

An example of the reinforcing method according to the present invention using a fiber-reinforced plastic plate as sheet (a) is discussed with reference to FIG. 6.

As in the example of the working process shown in FIG. 5, the reinforcing method of the present invention may be performed, first, by pretreating the surface of structure 11 to be reinforced, marking, forming primer layer 12, and smoothing the unevenness on the layer surface, as desired. Then flexible material layer 13 is formed, optionally the surface of the flexible material layer 13 is modified, and an undercoating layer (not shown) is formed as desired. Fiber-reinforced plastic plate 15' is affixed to the flexible material layer 13 with an adhesive, followed by formation of a finishing layer (protective layer) 17.

The adhesive for affixing the fiber-reinforced plastic plate 15' is preferably capable of providing a bonding strength between the flexible material layer and the plate 15' well greater than the tensile strength of the concrete.

The adhesive may contain a resin such as a thermosetting or room temperature-setting resin, with the latter being preferred for its handleability. Examples of the thermosetting and thermoplastic resins include those mentioned above, from which a suitable one may be selected for use. The adhesive may also contain, in addition to the resin, a suitable filler or thixotropic agent in order to maintain the adhesive within a suitable viscosity range or to prevent sagging upon application, as long as the objects of the present invention are achieved. Examples of such filler and thixotropic agent include those mentioned above, from which suitable ones may be selected for use. The content of the filler and/or thixotropic agent in the adhesive is preferably 1 to 20 wt %.

When the adhesive contains a room temperature-setting resin, the pot life of the resin is preferably 30 minutes to 5 hours, more preferably 30 minutes to 2 hours in view of the handleability of the adhesive. The time required for curing a painted layer of the adhesive at 20° C. is preferably 1 to 24 hours, more preferably 1 to 12 hours in view of work schedule.

The adhesive may be applied by means of a roller brush, rubber spatula, or the like tool, so that usually 0.05 to 3 kg/m², preferably 0.2 to 2 kg/m² of the adhesive is applied uniformly.

In the example of the working process discussed above, only one layer of the fiber-reinforced plastic plate is provided. However, in the present reinforcing method, two or more layers of the fiber-reinforced plastic plates may also be provided. Two or more layers of the plates may be provided by repeating the step of affixing the plastic plate with the adhesive a desired number of times.

The structure reinforcement of the present invention is a member for reinforcing concrete or steel structures, and has a flexible material layer and a sheet containing reinforcing fiber yarns. The flexible material layer has a tensile elongation of 10 to 200% at maximum load at 23° C., and a tensile strength of 0.1 to 50 N/mm² at 23° C. The flexible material and the sheet containing reinforcing fiber yarns are the same as the flexible material and sheet (a) mentioned above. The structure reinforcement may optionally have other layers and materials mentioned above, as desired.

By means of the reinforcing method or the structure reinforcement of the present invention, existing structures may be reinforced easily. In reinforcing an existing road tunnel, for example, it is not necessary to close the tunnel, and the lanes for one way may be opened during working. Further, the tunnel may be subjected to use immediately after the completion of the work.

Affixing the structure reinforcement may be followed by driving earth anchors through the structure reinforcement into the ground at particular intervals, and fixing the anchor heads with iron plates or bolts. The earth anchors may alternatively be driven into the ground prior to the affixing of the structure reinforcement or sheet (a). By combining the present invention with earth anchors, further safety is ensured in preventing concrete blocks from flaking.

The above working process is usually executed using a dedicated construction plant having carriages, depending on the size of the sectional area of a structure to be reinforced, as well as the range, scale, and conditions of construction. However, the working process may also be executed by means of robotized machinery or man power, using carriages of general use and temporary scaffolding. When the structure to be reinforced has a large sectional area, the working process may be executed mechanically, using a robot that is capable of affixing the structure reinforcement or sheet (a) and of applying the epoxy resin.

By combining the structure reinforcement of the present invention with ground reinforcement with anchor members, suspension of the structure, or arch setting, or with injection of a void filler for concrete surface or a soil improving agent into the concrete liner or the ground, the internal stress acting on the concrete liner is balanced, and the reinforcing effect may further be improved.

The reinforcing method of the present invention may be adopted quite flexibly to the degree and scale of reinforcement required by the structure, may be executed using a temporary plant of a relatively small scale, and may be adopted to a variety of special works under various conditions.

The structure reinforcement of the present invention may be fabricated on site during working as mentioned above, or alternatively, may be fabricated in advance as a laminate which has been cured and shaped into a desired size and thickness, and affixed to the structure surface via an adhesive layer and the like.

The reinforced structure according to the present invention is a structure wherein the above structure reinforcement has been provided over the surface of a concrete or steel structure to be reinforced, with the flexible material layer of the structure reinforcement interposed between the structure surface and the sheet containing reinforcing fiber yarns, and includes structures reinforced by the above reinforcing method. When the reinforced structure has a curved surface on its inner wall, it is preferred that the structure reinforcement has been provided at least over the curved surface on the inner wall of the structure, with the reinforcing fiber yarns of sheet (a) of the structure reinforcement arranged along the curvature of the curved surface, and with the flexible material layer of the structure reinforcement interposed between sheet (a) and the inner wall surface of the structure. When the reinforced structure has an annular inner wall surface, it is preferred that the structure reinforcement has been provided continuously in the circumferential direction of the inner wall surface over at least a portion of the length of the structure, with the reinforcing fiber yarns of sheet (a) of the structure reinforcement arranged in the circumferential direction of the annular inner wall, and with the flexible material layer of the structure reinforcement interposed between sheet (a) and the inner wall surface of the structure.

Figure 7:
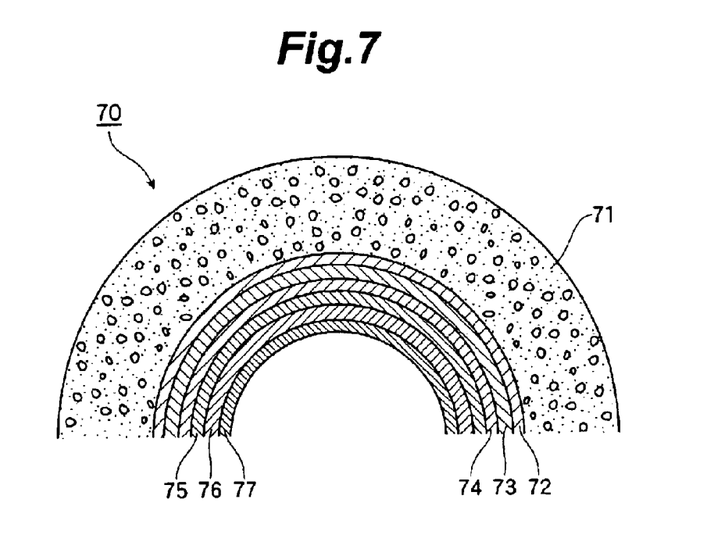
FIG. 7 is an illustration for explaining an embodiment of a reinforced structure according to the present invention, which is a concrete structure having a curved surface on its inner wall.

An example of the reinforced structure 70 according to the present invention is shown in FIG. 7, which has a curved surface on its inner wall.

The reinforced structure 70 has structure 71 having a longitudinally-extending curved surface, and primer layer 72, flexible material layer 73, undercoating layer 74, sheet 75 as sheet (a), overcoating layer 76, and surface finishing layer 77 formed in this order outwardly from the curved inner wall surface of the structure 71.

In the reinforced structure 70, only one layer of the sheet containing reinforcing fiber yarns has been provided. However, according to the present invention, two or more layers of the sheets containing reinforcing fiber yarns may also be provided. Two or more layers of the sheets may be provided by repeating the steps of undercoating, affixing the reinforcing fiber sheet, and overcoating a desired number of times.

The reinforced structure having the structure reinforcement thus formed on its curved surface, exhibits strength and rigidity a couple of times greater than those of a structure provided with a conventional sheet containing reinforcing fiber yarns. The reinforced structures of the present invention having the reinforcing fiber yarns of the sheet arranged along the curvature or along the circumference, are given still improved reinforcing effect. In particular, when a structure reinforced to be the reinforced structure has an annular inner wall surface, the structure reinforcement of the present invention has been provided over the entire or a portion of the length of the structure, with the reinforcing fiber yarns of the sheet of the structure reinforcement arranged continuously in the circumferential direction of the annular inner wall surface. Thus the reinforced structure exhibits an excellent property against tensile stress, compared to a corresponding structure provided with a conventional sheet containing reinforcing fiber yarns.

According to the reinforcing method of the present invention discussed heretofore, sheet (a) is provided over the surface of a structure to be reinforced, with the particular flexible material interposed therebetween, so that the structure and the sheet containing reinforcing fiber yarn is stably integrated, sheet (a) is prevented from being separated, and sufficient reinforcement is easily and conveniently given by maximum use of the strength of sheet (a). Further, sheet (a) for structure reinforcing according to the present invention exhibits, when used in the present reinforcing method, its maximum strength without being separated from the structure, and conveniently facilitates sufficient reinforcement. The structure reinforcement according to the present invention exhibits its maximum strength without being separated, and conveniently facilitates sufficient reinforcement.

EXAMPLES

The present invention will now be explained in further detail with reference to Examples and Comparative Examples, but the present invention is not limited thereto.

Example 1—1

A concrete test piece having main reinforcements and hoops arranged therein was reinforced in accordance with the reinforcing method of the present invention using the flexible material and the sheet containing reinforcing fiber yarns, and tested for its reinforcing effect.

Figure 8:
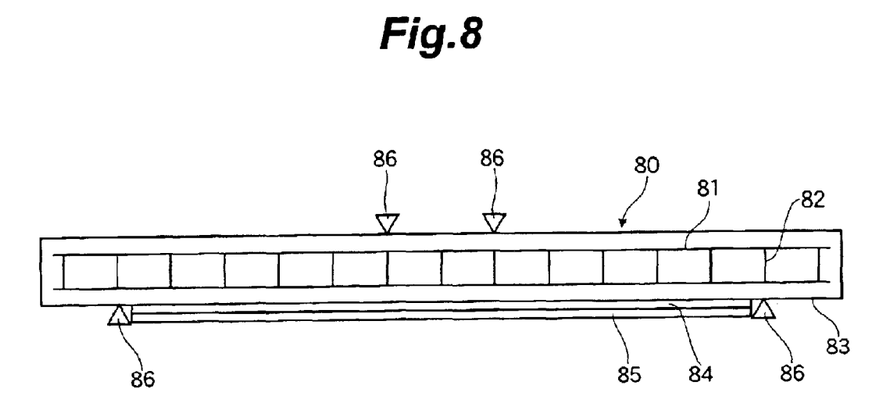
FIG. 8 is an illustration for explaining how to reinforce a test piece used in the tests in Examples 1—1 to 1-4 and Comparative Examples 1—1 to 1-3.

As a test piece, beam 80 shown in FIG. 8 was used, which was 2200 mm long, 200 mm wide, and 200 mm high. The beam 80 had four SD295 steel bars of D13 as main reinforcements 81, and SD295 steel bars of D6 as hoops 82 arranged at 150 mm intervals. On the bottom 83 of the test piece, an epoxy primer was applied for 1740 mm of the length (middle portion) over the entire width, to thereby form a primer layer (not shown). Then an epoxy flexible material (epoxy resin, trade name "TOHODITE EE50", manufactured by TOHO EARTHTECH, INC.; tensile elongation at maximum load at 23° C.: 95% (measured in accordance with JIS K7113), tensile strength at 23° C.: 1.4 N/mm$^2$ (measured in accordance with JIS K74113), tensile elongation at maximum load at 5° C.: 65%, tensile strength at 5° C: 6.5 N/mm$^2$, all in cured state) was applied to form flexible material layer 84 of 500 μm thick. Further, one layer of sheets 85 containing reinforcing fiber yarns (trade name "HT300", manufactured by NIPPON MITSUBISHI OIL CORPORATION) was affixed with a room temperature-setting epoxy resin so that the reinforcing fiber yarns are directed in the longitudinal direction of the main reinforcements.

Figure 9:
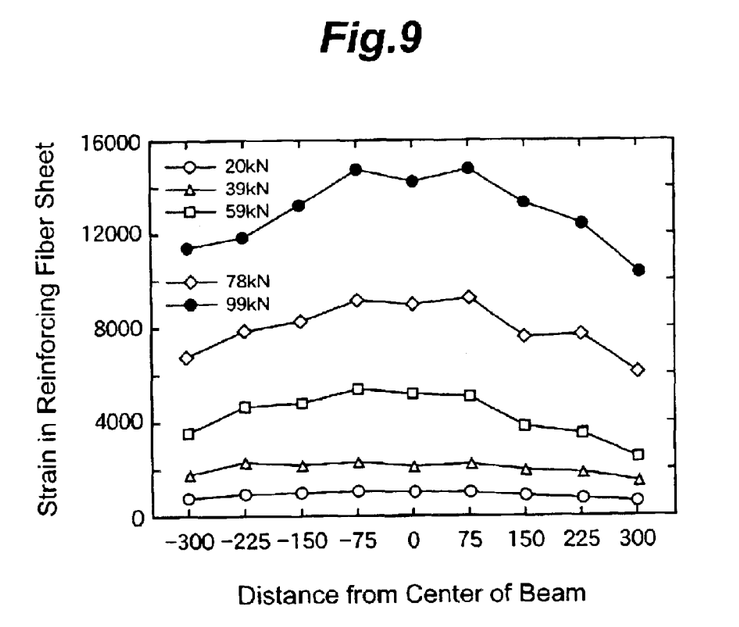
FIG. 9 is a graph showing the strain distribution of a sheet used in Example 1—1.
Figure 10:
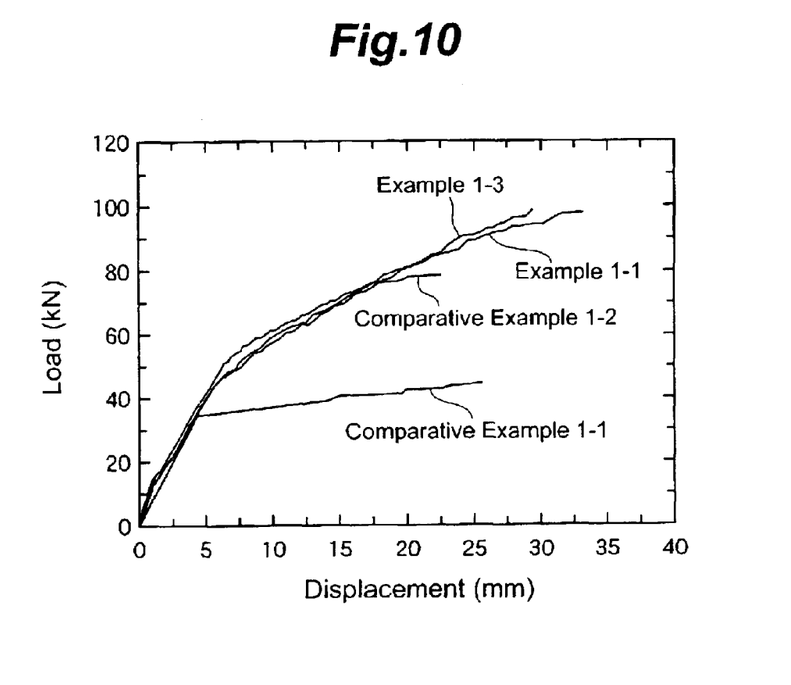
FIG. 10 is a graph showing the relationship between the applied load and the displacement in the tests in Examples 1—1 and 1-3, and Comparative Examples 1—1 and 1-2.

After curing for more than one week from the affixation of the sheets 85, a static loading test was conducted by bringing supporting points 86 into contact with the test piece as shown in FIG. 8, with 1800 mm distance between the supporting points and 300 mm distance between the loading points, and applying four-point monotonous load. The breaking load, maximum displacement, and maximum strain of the sheets 85 as measured, as well as the form of breaking of the sheets 85 observed at break are shown in Table 1. Further, the strain distribution of the sheet containing reinforcing fiber yarns (relationship between the distance from the center of the test piece and the strain) were measured for various loads. The results are shown in FIG. 9. The relationship between the applied load and the displacement are shown in FIG. 10.

Example 1-2

A concrete test piece having main reinforcements and hoops arranged therein was reinforced in accordance with the reinforcing method of the present invention using the flexible material and the sheet containing reinforcing fiber yarns, and tested for its reinforcing effect.

As a test piece, a beam as used in Example 1—1 was used. The sheets 85 was replaced with fiber-reinforced plastic plate 85, which was TU plate TYPE-S (trade name, manufactured by NIPPON MITSUBISHI OIL CORPORATION).

On the bottom of the test piece, the epoxy primer as used in Example 1—1 was applied for 1740 mm of the length (middle portion) over the entire width, to thereby form a primer layer. Then an epoxy flexible material (epoxy resin, trade name "TOHODITE EE50" manufactured by TOHO EARTHTECH, INC.; tensile elongation at maximum load at 23° C.: 95% (measured in accordance with JIS K7113), tensile strength at 23° C.: 1.4 N/mm$^2$ (measured in accordance with JIS K7113), tensile elongation at maximum load at 5° C.: 65%, tensile strength that 5° C.: 6.5 N/mm$^2$, all in cured state) was applied to form a flexible material layer of 500 μm thick. Further, one sheet of the fiber-reinforced plastic plate 85 was affixed with the room temperature-setting epoxy resin as used in Example 1—1 so that the reinforcing fibers are directed in the longitudinal direction of the main reinforcements.

After curing for more than one week from the affixation of the plastic plate, a static loading test was conducted by applying four-point monotonous load to the test piece, with 1800 mm distance between the supporting points and 300 mm distance between the loading points. The breaking load, maximum displacement, and maximum strain of the sheet containing reinforcing fibers as measured, as well as the form of breaking of the sheet observed at break are shown in Table 1.

Example 1-3

The static loading test was conducted in the same way as in Example 1—1, except that the flexible material layer 84 was formed in 1000 μm thickness. The results are shown in Table 1 and FIG. 10.

Example 1-4

A test piece was reinforced in accordance with the reinforcing method of the present invention in the same way as in Example 1—1, except that the flexible material was replaced with EE50W (epoxy resin, trade name "TOHODITE EE50W", manufactured by TOHO EARTHTECH, INC.; tensile elongation at maximum load at 23° C.: 56% (measured in accordance with JIS K7113), tensile strength at 23° C.: 1.2 N/mm$^2$ (measured in accordance with JIS K7113), tensile elongation at maximum load at 5° C.: 55%, tensile strength at 5° C.: 5 N/mm$^2$, all in cured state), and the static loading test was conducted. The breaking load, maximum displacement, and maximum strain of the sheet containing reinforcing fibers, as well as the form of breaking of the sheet observed at break are shown in Table 1.

TABLE 1

|  | Breaking load (kN) | Maximum displacement (mm) | Maximum strain of sheet containing reinforcing fiber yarns (μ) | Form of breaking of sheet containing reinforcing fiber yarns |
| --- | --- | --- | --- | --- |
| Example 1-1 | 98.9 | 34 | 14757 | broken |
| Example 1-2 | 97.8 | 34 | 14624 | broken |
| Example 1-3 | 97.4 | 30 | 13848 | broken |
| Example 1-4 | 96.9 | 28 | 13279 | broken |

Comparative Example 1—1

The static loading test was conducted in the same way as in Example 1—1 on a test piece as used in Example 1—1 but without any reinforcement. The results are shown in Table 2 and FIG. 10.

Comparative Example 1-2

Figure 11:
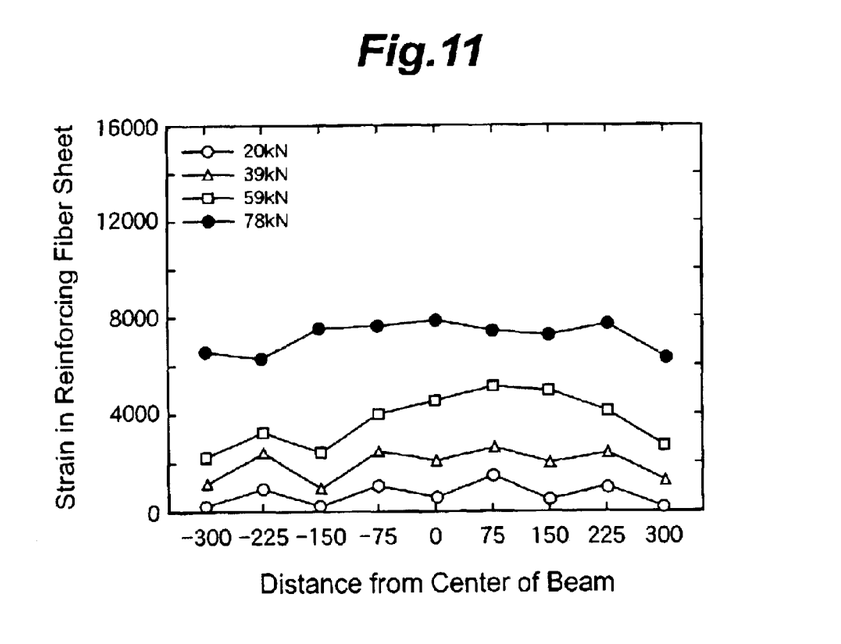
FIG. 11 is a graph showing the strain distribution of the sheet used in Comparative Example 1-2.

A test piece was reinforced in the same way as in Example 1—1, except that the flexible material layer was not formed, and the static loading test was conducted in the same way as in Example 1—1. The results are shown in Table 2 and FIGS. 10 and 11.

Comparative Example 1-3

A test piece was reinforced in the same way as in Example 1—1, except that the flexible material was replaced with a flexible material layer of an epoxy resin (tensile elongation at maximum load at 23° C.: 5% (measured in accordance with JIS K7113), tensile strength at 23° C.: 40 N/mm$^2$ (measured in accordance with JIS K7113), and the static loading test was conducted in the same way as in Example 1—1. The results are shown in Table 2 and FIG. 10.

TABLE 2

|  | Breaking load (kN) | Maximum displacement (mm) | Maximum strain of sheet containing reinforcing fiber yarns ($\mu$) | Form of breaking of sheet containing reinforcing fiber yarns |
|---|---|---|---|---|
| Comparative Example 1-1 | 441 | 24 | — | — |
| Comparative Example 1-2 | 78.3 | 22 | 7790 | separated |
| Comparative Example 1-3 | 76.4 | 23 | 7840 | separated |

Example 2-1

A steel test piece was reinforced in accordance with the reinforcing method of the present invention using the flexible material and the sheet containing reinforcing fiber yarns, and tested for its reinforcing method.

Figure 12:
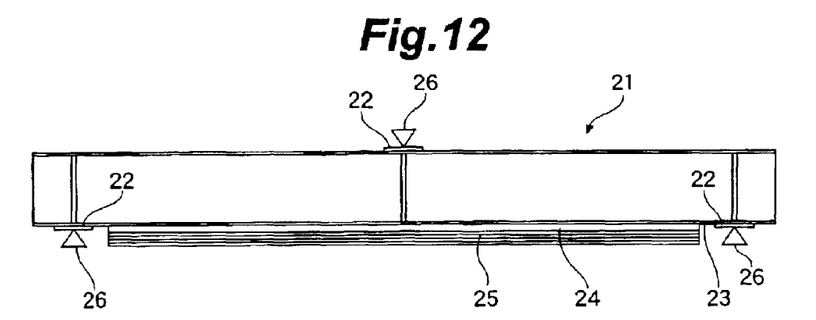
FIG. 12 is an illustration for explaining how to reinforce a test piece used in the tests in Examples 2-1 to 2—2 and Comparative Examples 2-1 to 2—2.

As a test piece, I steel 21 for beam shown in FIG. 12 was used, which was 200 mm×100 mm×2000 mm in size. The I steel 21 was reinforced at loading points and supporting points with steel plates 22 of 5.5 mm thick. On the bottom 23 of the test piece, an epoxy primer was applied for 1600 mm of the length (middle portion) over the entire width, to thereby form a primer layer (not shown). Then an epoxy flexible material (epoxy resin, trade name "TOHODITE EE50", manufactured by TOHO EARTHTECH, INC.; tensile elongation at maximum load at 23° C.: 95% (measured in accordance with JIS K7131), tensile strength at 23° C.: 1.4 N/mm$^2$ (measured in accordance with JIS K7131), tensile elongation at maximum load at 5° C.: 65%, tensile strength at 5° C.: 6.5 N/mm$^2$, all in cured state) was applied to form flexible material layer 24 of 500 $\mu$m thick. Further, five layers of sheets 25 containing reinforcing fiber yarns (trade name "HT300", manufactured by NIPPON MITSUBISHI OIL CORPORATION) were affixed with a room temperature-setting epoxy resin so that the reinforcing fibers are directed in the longitudinal direction. After curing for more than one week after the affixation of the sheets 25, a static loading test was conducted by bringing supporting points 26 into contact with the test piece I steel 21 as shown in FIG. 12, with 1800 mm distance between the supporting points, and applying monotonous load. The breaking load and maximum displacement as measured are shown in Table 3.

Example 2—2

A steel test piece was reinforced in accordance with the reinforcing method of the present invention using the flexible material and the fiber-reinforced plastic plate, and tested for its reinforcing method.

As a test piece, an I steel as used in Example 2-1 was used. The sheets 25 were replaced with fiber-reinforced plastic plates 25, which were TU plate TYPE-S (trade name, manufactured by NIPPON MITSUBISHI OIL CORPORATION). On the bottom of the test piece, the epoxy primer as used in Example 2-1 was applied for 1600 mm of the length (middle portion) over the entire width, to thereby form a primer layer. Then an epoxy flexible material (epoxy resin, trade name "TOHODITE EE50" manufactured by TOHO EARTHTECH, INC.; tensile elongation at maximum load at 23° C.: 95% (measured in accordance with JIS K7113), tensile strength at 23° C.: 1.4 N/mm$^2$ (measured in accordance with JIS K7131) both in cured state) was applied to form flexible material layer 24 of 500 $\mu$m thick. Further, five sheets of the fiber-reinforced plastic plates 25 were affixed with the room temperature-setting epoxy resin as used in Example 2-1 so that the reinforcing fibers are directed in the longitudinal direction. After curing for more than one week from the affixation of the plastic plates 25, a static loading test was conducted by bringing supporting points 26 into contact with the I steel 21, with 1800 mm distance between the loading points, and applying monotonous load. As a result, good reinforcing effect was observed.

Comparative Example 2-1

The static loading test was conducted in the same way as in Example 2-1 on a test piece as used in Example 2-1 but without any reinforcement. The results are shown in Table 3.

Comparative Example 2—2

The static loading test was conducted in the same way as in Example 2-1, except that the flexible material layer 24 was not formed. The results are shown in Table 3.

TABLE 3

|  | Breaking load (kN) | Maximum displacement (mm) |
|---|---|---|
| Example 2-1 | 19.1 | 18.4 |
| Comparative Example 2-1 | 17.0 | 58.0 |
| Comparative Example 2-2 | 17.5 | 16.9 |

Example 3-1

A concrete Hume pipe (JIS A5303B, Type 1; inner diameter: 1200 mm, thickness: 95 mm, length: 2430 mm) was cleaned on its inner wall by high pressure water jet, and an epoxy primer was applied all over the inner wall to form a primer layer.

Then 600 g/m$^2$ of a starting material for an epoxy flexible material (EE50 manufactured by TOHO EARTHTECH, INC.) was applied all over the inner wall to form a flexible material layer of 500 $\mu$m thick. A molded product prepared in the same way as for this flexible material layer was measured for its properties, to exhibit 95% tensile elongation at maximum load and 1.4 N/mm$^2$ tensile strength, both measured at 23° C. in accordance with JIS K7113, and 65% tensile elongation at maximum load and 6.5 N/mm$^2$ tensile strength, both measured at 5° C. in accordance with JIS K 7113.

Next, a matrix resin (trade name "BOND E 2500", manufactured by KONISHI CO., LTD.) was applied over the flexible material layer by means of a roller, and the surface was lined with reinforcing fiber sheets (TU Cloth ST 200-50, manufactured by NIPPON MITSUBISHI CORPORATION, fiber area weight: 200 g/m$^2$; sheet width: 50 mm; design thickness: 0.11 mm; tensile strength: 3430 N/mm$^2$; tensile modulus of elasticity: 2.3×10$^5$ N/mm$^2$). The sheets containing reinforcing fiber yarns were arranged in the circumferential direction of the Hume pipe, and pressed with an impregnation roller. As a result, the sheets were embedded in the matrix resin. The application of the matrix resin and the laminating with the sheets were repeated, to form two layers of the sheets containing reinforcing fiber yarns all over the inner wall of the Hume pipe.

Figure 13:
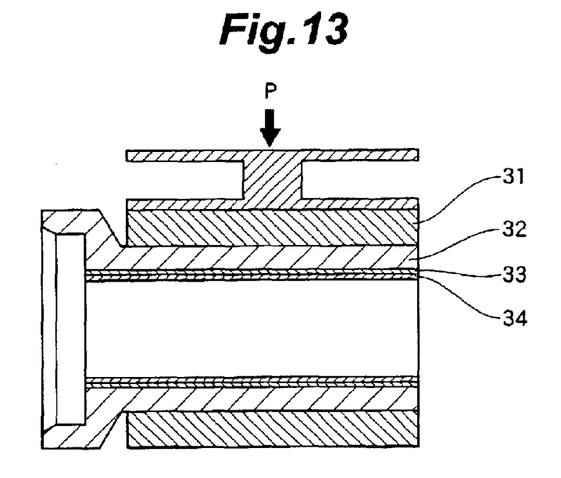
FIG. 13 is a schematic front view of the apparatus and the reinforced concrete structure used in the loading test in Example 3-1 and others.
Figure 14:
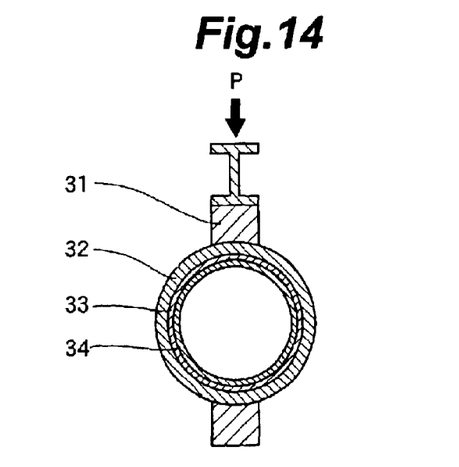
FIG. 14 is a schematic side view of the apparatus and the reinforced concrete structure of FIG. 13.

The reinforced Hume pipe thus obtained was subjected to a loading test in accordance with JIS A5303 "Centrifugal Reinforced Concrete Pipe", wherein load P was applied until the pipe breaks. The structure of the reinforcement and the outline of the test are shown in FIGS. 13 and 14, and the results are shown in Table 4. Incidentally, in FIGS. 13 and 14, the reference numeral 32 refers to the concrete Hume pipe, 33 to the flexible material layer, 34 to the reinforcing fiber sheets, and 31 to a jig for loading.

The resulting reinforced Hume pipe was observed to have an improved durability compared to a non-reinforced Hume pipe, and the tensile stress generated on the top and bottom of the pipe was observed to be dispersed in the circumferential directions of the pipe by means of the flexible material layer. It was demonstrated that the reinforced Hume pipe had properties superior to those of Comparative Examples to be discussed below.

Comparative Example 3-1

A reinforced Hume pipe was prepared in the same way as in Example 3-1, except that the flexible material layer was not formed, and the loading test was conducted. The results are shown in Table 4.

Comparative Example 3-2

The loading test was conducted in the same way as in Example 1 on the Hume pipe before reinforcement as used in Example 3-1. The results are shown in Table 4.

TABLE 4

|  | Example 3-1 | Comparative Example 3-1 | Comparative Example 3-2 |
|---|---|---|---|
| Number of laminated layers of sheets containing reinforcing fiber yarns | 2 | 2 | 0 |
| Flexible material layer | present | absent | absent |
| Maximum load (kN) | 466 | 398 | 354 |
| Ratio of the reinforced to the non-reinforced | 1.32 | 1.12 | — |

Example 3-2

A concrete Hume pipe (JIS A 5303 B, Type 1; inner diameter: 1200 mm, thickness: 95 mm, length: 2430 mm) was cut to obtain an exactly semicylindrical Hume pipe.

This semicylindrical Hume pipe was cleaned on its inner wall by high pressure water jet, and an epoxy primer was applied all over the inner wall to form a primer layer.

Then 600 g/m² of a starting material for an epoxy flexible material (EE50 manufactured by TOHO EARTHTECH, INC.) was applied all over the inner wall to form a flexible material layer of 500 μm thick. A molded product prepared in the same way as for this flexible material layer was measured for its properties, to exhibit 95% tensile elongation at maximum load and 1.4 N/mm² tensile strength, both measured in accordance with JIS K7113, and 1.5 N/mm² tensile modulus of elasticity measured in accordance with JIS K7113, all at 23° C., and 65% tensile elongation at maximum load and 6.5 N/mm² tensile strength, both measured at 5° C. in accordance with JIS K 7113.

Next, a matrix resin (trade name "BOND E 2500", manufactured by KONISHI CO., LTD.) was applied over the flexible material layer by means of a roller, and the surface was lined with reinforcing fiber sheets (TU Cloth WT 200-50, manufactured by NIPPON MITSUBISHI OIL CORPORATION, fiber area weight: 200 g/m², sheet width: 50 mm, design thickness: 0.11 mm, tensile strength: 3430 N/mm², tensile modulus of elasticity: 2.3×10⁵ N/mm²). The sheets containing reinforcing fiber yarns were arranged in the circumferential direction of the Hume pipe, and pressed with an impregnation roller. As a result, the sheets were embedded in the matrix resin. The application of the matrix resin and the laminating with the sheets containing reinforcing fiber yarns were repeated, to form two layers of the sheets containing reinforcing fiber yarns all over the inner wall of the Hume pipe.

Figure 15:
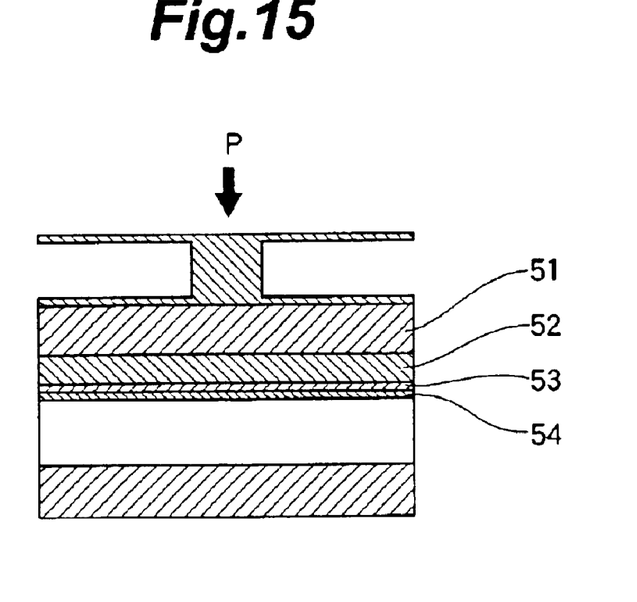
FIG. 15 is a schematic front view of the apparatus and the reinforced semicylindrical concrete structure used in the loading test in Example 3-2 and others.
Figure 16:
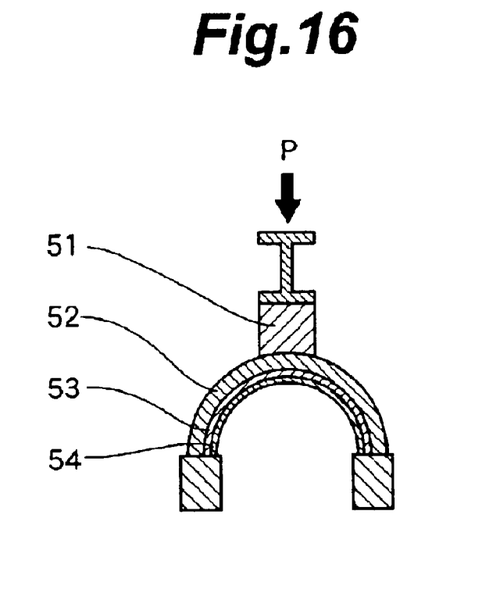
FIG. 16 is a schematic side view of the apparatus and the reinforced semicylindrical concrete structure of FIG. 15.

The reinforced semicylindrical Hume pipe thus obtained was subjected to a loading test in accordance with JIS A5303 "Centrifugal Reinforced Concrete Pipe", wherein load P was applied until the pipe breaks. The structure of the reinforcement and the outline of the test are shown in FIGS. 15 and 16, and the results are shown in Table 5. Incidentally, in FIGS. 15 and 16, the reference numeral 52 refers to the semicylindrical concrete Hume Pipe, 53 to the flexible material layer, 54 to the reinforcing fiber sheets, and 51 to a jig for loading.

The resulting reinforced Hume pipe was observed to have an improved durability compared to a non-reinforced Hume pipe, and the tensile stress generated on the top and bottom of the pipe was observed to be dispersed in the circumferential directions of the pipe by means of to the flexible material layer. It was demonstrated that the reinforced Hume pipe had properties superior to those of Comparative Examples to be discussed below.

Comparative Example 3—3

A reinforced semicylindrical Hume pipe was prepared in the same way as in Example 3-2, except that the flexible material layer was not formed, and the loading test was conducted. The results are shown in Table 5.

Comparative Example 3-4

The loading test was conducted in the same way as in Example 3-2 on the semicylindrical Hume pipe before reinforcement as used in Example 3-2. The results are shown in Table 4.

TABLE 5

|  | Example 3-2 | Comparative Example 3-3 | Comparative Example 3-4 |
|---|---|---|---|
| Number of laminated layers of sheets containing reinforcing fiber yarns | 2 | 2 | 0 |
| Flexible material layer | present | absent | absent |
| Maximum load (kN) | 409 | 339 | 302 |
| Ratio of the reinforced to the non-reinforced | 1.35 | 1.12 | — |

What is claimed is:
1. A method for reinforcing a structure comprising:
(A) providing a flexible material layer and a sheet containing reinforcing fiber yarns impregnated with a matrix resin over a surface of a structure selected from the group consisting of concrete and steel structures so that said flexible material layer is interposed between said sheet and the structure,
said flexible material layer having a tensile elongation of 10 to 200% at maximum load at 23° C. and 10 to 200% at maximum load at 5° C., and a tensile strength of 0.1 to 50 N/mm² at 23° C. and 0.1 to 50 N/mm² at 5° C., wherein said flexible material layer has a larger tensile elongation at maximum load than that of said matrix resin in said sheet containing reinforcing fiber yarns.

2. The method of claim 1, wherein said structure is selected from the group consisting of beams, columns, slabs, stacks, RC beams, tunnels, pipes, tubes, ducts, conduits, bridges having a curved surface, and U-shaped gutters.

3. The method of claim 1, wherein said structure has a curved surface on its inner wall, and wherein said step (A) comprises providing said flexible material layer and said sheet containing reinforcing fiber yarns at least over said curved surface on the inner wall of said structure with said flexible material layer interposed between said sheet and the structure, so that said reinforcing fiber yarns of said sheet are arranged along a curvature of said curved surface.

4. The method of claim 1, wherein said structure has an annular inner wall surface, and wherein said step (A) comprises providing said flexible material layer and said sheet containing reinforcing fiber yarns continuously in a circumferential direction of said inner wall surface over at least a portion of a length of said structure, with said flexible material layer interposed between said sheet and the structure, so that said reinforcing fiber yarns of said sheet are arranged in a circumferential direction of said annular inner wall.

5. The method of claim 1, wherein said flexible material comprises 50 to 100 wt % of a resin and 0–50 wt % of a filler, said resin having a tensile modulus of elasticity of 0.1 to 50 N/mm² at 5° C. when cured.

6. The method of claim 1, wherein said sheet containing reinforcing fiber yarns impregnated with a matrix resin comprises a reinforcing material having a plurality of longitudinal reinforcing fiber yarns arranged parallel to each other in a longitudinal direction of said sheet.

7. The method of claim 1, wherein said reinforcing material further has a plurality of transverse threads arranged parallel to each other in a transverse direction of said sheet, said transverse threads being selected from the group consisting of transverse reinforcing fiber yarns and transverse supplementary threads, and wherein said longitudinal reinforcing fiber yarns and said transverse threads form a woven structure.

8. The method of claim 6, wherein said longitudinal reinforcing fiber yarns and said transverse threads are fixed to each other with fixing members.

9. The method of claim 1, wherein said reinforcing material further has a plurality of longitudinal supplementary threads arranged parallel to each other in a longitudinal direction of said sheet, and a plurality of transverse supplementary threads arranged parallel to each other in a transverse direction of said sheet, said reinforcing material having a woven structure wherein said longitudinal reinforcing fiber yarns are substantially not bent with said longitudinal and transverse supplementary threads.

10. The method of claim 1, further comprising a support for supporting said reinforcing material, wherein said reinforcing material is affixed to said support by means of a binder.

11. The method of claim 1, where in said flexible material layer has a thickness of 100 to 2000 μm.

12. The method of claim 1 wherein the flexible material is first attached to the structure and then the sheet is placed over the flexible material.

13. The method of claim 1 wherein the flexible material is placed on the sheet to form a composite and the composite is attached to the structure with the flexible material being between the structure and the sheet.

14. A structure reinforcement for reinforcing a structure selected from the group consisting of concrete and steel structures, said reinforcement comprising a flexible material layer and a sheet containing reinforcing fiber yarns, said flexible material layer to be interposed between the structure and said sheet and having a tensile elongation of 10 to 200% at maximum load at 23° C. and 10 to 200% at maximum load at 5° C., and a tensile strength of 0.1 to 50 N/mm² at 23° C. and 0.1 to 50 N/mm² at 5° C.

15. A reinforced structure wherein a structure reinforcement of claim 13 is provided over a surface of a structure selected from the group consisting of concrete and steel structures, with a flexible material layer of said structure reinforcement interposed between the surface of the structure and a sheet containing reinforcing fiber yarns of said structure reinforcement.

16. The reinforced structure of claim 15, wherein said structure has a curved surface on its inner wall, and wherein said structure reinforcement is provided at least over said curved surface on the inner wall of said structure, with said reinforcing fiber yarns of the sheet of the structure reinforcement arranged along a curvature of said curved surface, and with said flexible material layer of the structure reinforcement interposed between said sheet and the surface of the inner wall of the structure.

17. The reinforced structure of claim 15, wherein said structure has an annular inner wall surface, and wherein said structure reinforcement is provided continuously in a circumferential direction of said inner wall surface over at least a portion of a length of said structure, with said reinforcing fiber yarns of the sheet of the structure reinforcement arranged in a circumferential direction of the annular inner wall, and with said flexible material layer of the structure reinforcement interposed between said sheet and the inner wall surface of the structure.

18. A method for reinforcing a structure comprising the step of:

providing a flexible material layer and a sheet containing reinforcing fiber yarns impregnated with a matrix resin over a surface of a structure selected from the group consisting of concrete and steel structures, so that said flexible material layer is interposed between said sheet and the structure, said flexible material layer having a tensile elongation of 10 to 200% at maximum load at 23° C., and a tensile strength of 0.1 to 50 N/mm² at 23° C., wherein said flexible material layer has a larger tensile elongation at maximum load than that of said matrix resin in said sheet containing reinforcing fiber yarns, and wherein said flexible material comprises 50 to 100 wt % of a resin and 0 to 50 wt % of a filler, said resin having a tensile modulus of elasticity of 0.1 to 50 N/mm² at 23° C. when cured.

19. A structure reinforcement for reinforcing a structure selected from the group consisting of concrete and steel structures, said reinforcement comprising a flexible material layer and a sheet containing reinforcing fiber yarns, said flexible material layer to be interposed between the structure and said sheet and having a tensile elongation of 10 to 200% at maximum load at 23° C., and a tensile strength of 0.1 to 50 N/mm² at 23° C., wherein said flexible material comprises 50 to 100 wt % of a resin and 0 to 50 wt % of a filler, said resin having a tensile modulus of elasticity of 0.1 to 50 N/mm² at 23° C. when cured.

* * * * *